US012725774B2

(12) United States Patent
Maeda

(10) Patent No.: US 12,725,774 B2
(45) Date of Patent: Sep. 1, 2026

(54) MASS SPECTROMETER

(71) Applicant: SHIMADZU CORPORATION, Kyoto (JP)

(72) Inventor: Kazuma Maeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 270 days.

(21) Appl. No.: 18/726,904

(22) PCT Filed: Feb. 3, 2022

(86) PCT No.: PCT/JP2022/004268
§ 371 (c)(1),
(2) Date: Jul. 5, 2024

(87) PCT Pub. No.: WO2023/148887
PCT Pub. Date: Aug. 10, 2023

(65) Prior Publication Data
US 2025/0104992 A1 Mar. 27, 2025

(51) Int. Cl.
*H01J 49/42* (2006.01)
*G01N 30/72* (2006.01)

(52) U.S. Cl.
CPC ...... *H01J 49/4215* (2013.01); *G01N 30/7233* (2013.01)

(58) Field of Classification Search
CPC ......................... H01J 49/4215; G01N 30/7233
See application file for complete search history.

(56) References Cited

U.S. PATENT DOCUMENTS

2016/0209378 A1* 7/2016 Kobayashi .......... H01J 49/4225
2017/0138916 A1* 5/2017 Sumiyoshi ......... G01N 30/7233

FOREIGN PATENT DOCUMENTS

CN 105492903 A * 4/2016 ......... G01N 30/8644
JP 2012195104 A * 10/2012
WO WO-2015029101 A1 * 3/2015 ......... G01N 30/8644
WO WO-2016002046 A1 * 1/2016 ............. G01N 30/72

OTHER PUBLICATIONS

Written Opinion (ISA237) for PCT application No. PCT/JP2022/004268 dated Mar. 29, 2022.

* cited by examiner

*Primary Examiner* — Andrew Smyth
(74) *Attorney, Agent, or Firm* — Muir Patent Law, PLLC

(57) ABSTRACT

A mass spectrometer capable of performing scan measurement, includes: a provisional event time determining unit to determine a provisional event time to be assigned to a scan measurement event, which is a measurement unit for performing one scan measurement, in accordance with an analysis condition specified by a user; a scan speed selection unit to select a scan speed from candidates such that a measurement time required for one scan measurement does not exceed the provisional event time of the scan measurement event; an event time determining unit to correct the provisional event time of the scan measurement event to a time required for scan measurement under the selected scan speed, and set the provisional event time that has been corrected as an event time of the scan measurement event; and a control information creation unit to create control information for controlling the mass spectrometer based on the event time.

5 Claims, 3 Drawing Sheets

MASS SPECTROMETER

TECHNICAL FIELD

The present invention relates to a mass spectrometer.

BACKGROUND ART

In a quadrupole mass spectrometer, generally, a scan measurement mode and a selected ion monitoring (SIM) measurement mode are provided as measurement modes. In the scan measurement mode, m/z values of ions to be measured are sequentially changed over a predetermined mass-to-charge ratio (m/z) range to comprehensively measure ions included in the m/z range. On the other hand, in the SIM measurement mode, only ions having a specified m/z value are selectively measured.

In a triple quadrupole mass spectrometer capable of MS/MS analysis, scan measurement modes and a multi reaction monitoring (MRM) measurement mode are provided as measurement modes, in which the scan measurement modes include a product ion scan measurement mode, a precursor ion scan measurement mode, and a neutral loss scan measurement mode.

In the product ion scan measurement mode, the m/z value of a precursor ion is fixed, and measurement is performed while changing the m/z value of product ions within a predetermined m/z range. In the precursor ion scan measurement mode, the m/z value of a product ion is fixed, and measurement is performed while changing the m/z value of precursor ions within a predetermined m/z range. In the neutral loss scan measurement mode, the measurement is performed while the difference (that is, neutral loss) between the m/z value of a precursor ion and the m/z value of a product ion is kept constant and the m/z value of the precursor ion and the m/z value of the product ion are changed within a predetermined m/z range. In the MRM measurement mode, product ions of a specific m/z value generated by dissociating precursor ions of a specific m/z value designated are selectively measured.

In both the quadrupole mass spectrometer and the triple quadrupole mass spectrometer, in the scan measurement, measurement is performed over a wide m/z range while a radio frequency (RF) voltage and a direct current voltage applied to the quadrupole mass filter are changed at high speed while maintaining a predetermined relationship. The rate of change in the m/z value of a measurement target corresponding to the voltage change is called a scan speed, and is represented in units of u/sec.

In a liquid chromatograph mass spectrometer (LC-MS) or a gas chromatograph mass spectrometer (GC-MS), the time interval of sample points constituting a chromatogram can be narrowed as the scan speed is set faster, and the accuracy of a peak waveform in the chromatogram is improved. Such improvement increases the accuracy of the retention time and peak area value corresponding to a peak top. On the other hand, as the scan speed increases, the quality of a mass spectrum decreases (refer to Patent Literature 1, for example), and the accuracy of the m/z value at a mass peak in the centroid mass spectrum decreases. For this reason, the scan speed is one of important parameters of the mass spectrometer, and the fastest value of the scan speed is determined depending on the apparatus (model).

In a conventional mass spectrometer, prior to analysis, a user sets a measurement unit (hereinafter, referred to as "event") as one scan measurement over a target m/z range, so that the execution time of one measurement unit (hereinafter, referred to as "event time") is set as one analysis condition directly or indirectly. The case where the event time is indirectly set is a case where, for example, as disclosed in Patent Literature 2, when a user specifies a loop time corresponding to a time interval of sampling points (that is, a sampling period) constituting a chromatogram as one of analysis conditions, the event time is automatically derived in accordance with the number of events to be performed during a loop time.

Once the event time for scan measurements is determined, software or firmware for control of the mass spectrometer selects the optimal, typically slowest, scan speed from among a plurality of discrete scan speeds that are prepared previously to the extent that the event time is not exceeded. In this way, in the conventional mass spectrometer, the optimum scan speed is automatically set in accordance with the event time of an event at which the scan measurement is performed.

CITATION LIST

Patent Literature

Patent Literature 1: JP 2012-195104 A
Patent Literature 2: WO 2016/002046 A

SUMMARY OF INVENTION

Technical Problem

In the field of mass spectrometry, improvement in accuracy of acquired data and improvement in detection sensitivity are always required. For this purpose, in a series of measurement processes for acquiring data, it is important to reduce an unnecessary time that does not substantially contribute to the acquisition of data and to allocate the time to the acquisition of data. The present inventor has reviewed the flow of analysis performed in the conventional mass spectrometer from such a viewpoint, and has found that there is an unnecessary time during which data acquisition is not substantially performed in a series of measurements.

The present invention has been made to solve such a problem, and an object of the present invention is to provide a mass spectrometer that is more efficient and has high analysis performance by eliminating substantially non-measurement time as much as possible.

Solution to Problem

One aspect of a mass spectrometer according to the present invention is a mass spectrometer capable of performing scan measurement, the mass spectrometer including:

a provisional event time determining unit configured to determine a provisional event time to be assigned to a scan measurement event, which is a measurement unit for performing one scan measurement, in accordance with an analysis condition specified by a user;

a scan speed selection unit configured to select a scan speed from a plurality of candidates such that a measurement time required for one scan measurement does not exceed the provisional event time of the scan measurement event;

an event time determining unit configured to correct the provisional event time of the scan measurement event to a time required for scan measurement under the scan speed selected by the scan speed selection unit, and set the provisional event time that has been corrected as an event time of the scan measurement event; and a control information creation unit configured to create control information for controlling the mass spectrometer based on the event time determined by the event time determining unit.

Advantageous Effects of Invention

In the conventional mass spectrometer, in many cases, the time required for the scan measurement performed in a scan measurement event is shorter than the event time assigned to the scan measurement event, and thus an unnecessary time during which data acquisition is not performed may be generated near the end of each scan measurement event. In contrast, according to the above aspect of the mass spectrometer according to the present invention, the event time of a scan measurement event is shortened in accordance with the time required for the scan measurement under an adopted scan speed.

As a result, an unnecessary time during which the measurement is not substantially performed conventionally is eliminated, and for example, the time interval of repetition of the scan measurement can be shortened by the eliminated time to improve the accuracy of a peak waveform in a chromatogram. Alternatively, it is possible to extend the time of an event which is performed apparently in parallel with the scan measurement, such as SIM measurement or MRM measurement, by the time obtained by shortening the event time of the scan measurement event. Extending the event time of, for example, the SIM measurement or the MRM measurement, the data capturing time in the event can be lengthened, and the detection sensitivity can be improved.

DESCRIPTION OF EMBODIMENTS

An LC-MS which is an embodiment of a mass spectrometer according to the present invention will be described with reference to the accompanying drawings.

Figure 1:
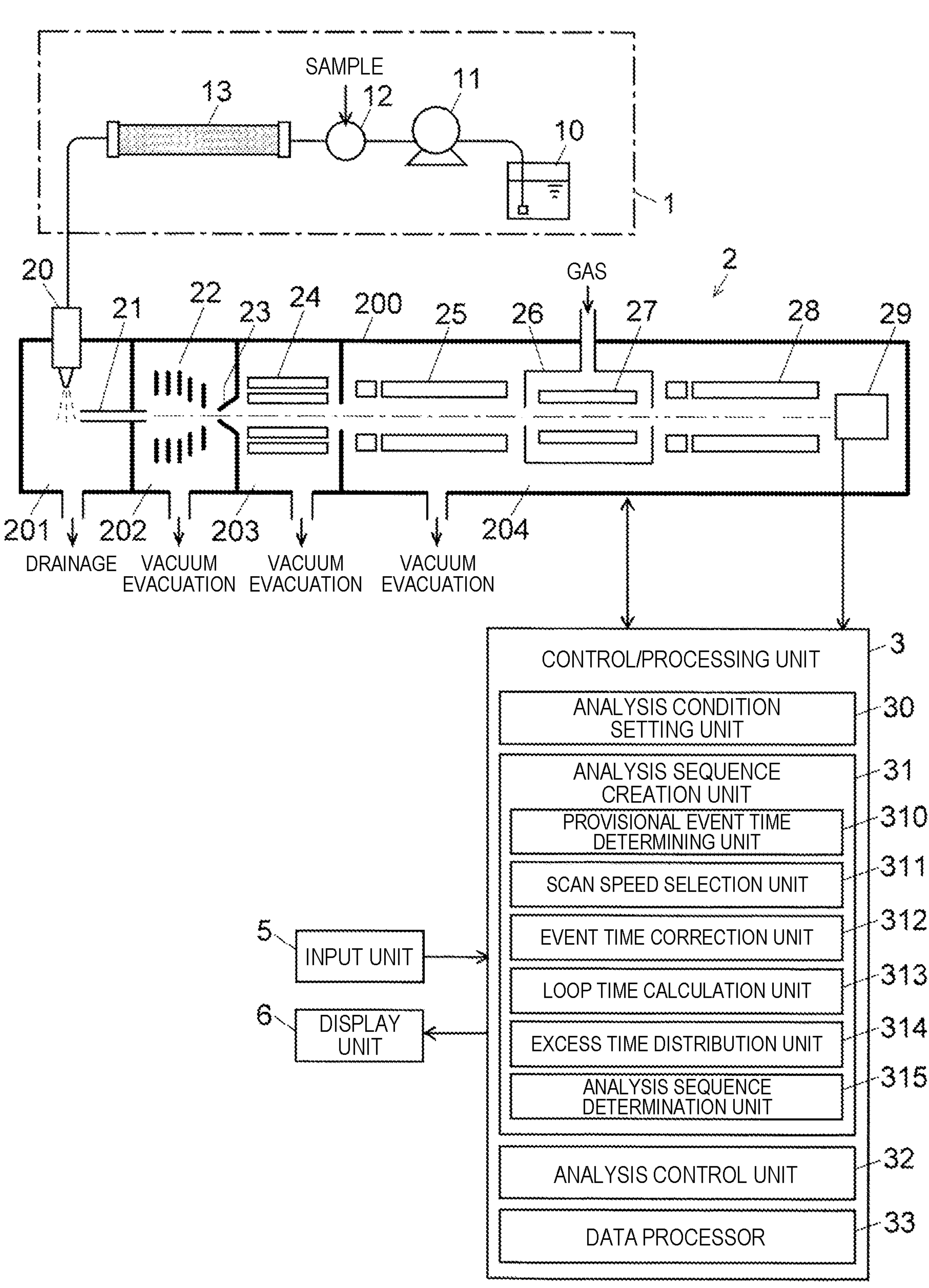
FIG. 1 is a configuration diagram of a main part of an LC-MS that is an embodiment of a mass spectrometer according to the present invention.

FIG. 1 is a configuration diagram of a main part of an LC-MS of the present embodiment.

The LC-MS includes a liquid chromatograph unit (LC unit) 1 and a mass spectrometer unit (MS unit) 2 which are measurement units, a control/processing unit 3, an input unit 5, and a display unit 6.

The LC unit 1 includes a mobile phase container 10, a liquid feeding pump 11 configured to suck and feed a mobile phase, an injector 12 configured to supply a sample into the mobile phase, and a column 13 configured to separate components (compounds) contained in the sample in a time direction.

The MS unit 2 is a triple quadrupole mass spectrometer, and includes an ionization chamber 201 maintained at substantially atmospheric pressure atmosphere and a vacuum chamber 200 whose inner space is divided into three compartments. Formed within the vacuum chamber 200 are a first intermediate vacuum chamber 202, a second intermediate vacuum chamber 203, and a high vacuum chamber 204. These chambers are individually evacuated by a vacuum pump (turbomolecular pump and rotary pump, which are not shown) so that their degrees of vacuum increase in the mentioned order. That is, the MS unit 2 has the configuration of a multi-stage differential pumping system.

In the ionization chamber 201, an electrospray ionization (ESI) probe 20 to which an eluate is supplied from an outlet of the column 13 is disposed. The ionization chamber 201 and the first intermediate vacuum chamber 202 communicate with each other through a desolvation tube 21 having a small diameter. The first intermediate vacuum chamber 202 communicates with the second intermediate vacuum chamber 203 through an orifice formed at the apex of a skimmer 23. Multipole ion guides 22 and 24 are disposed within the first and second intermediate vacuum chambers 202 and 203, respectively.

In the high vacuum chamber 204, a front quadrupole mass filter 25, a collision cell 26 in which a multipole ion guide 27 is disposed, a rear quadrupole mass filter 28, and an ion detector 29 are disposed along an ion optical axis.

The control/processing unit 3 controls each of the LC unit 1 and the MS unit 2 and processes a signal obtained by the MS unit 2. The control/processing unit 3 includes, as functional blocks, an analysis condition setting unit 30, an analysis sequence creation unit 31, an analysis control unit 32, and a data processor 33. The analysis sequence creation unit 31 includes, as lower functional blocks, a provisional event time determining unit 310, a scan speed selection unit 311, an event time correction unit 312, a loop time calculation unit 313, an excess time distribution unit 314, and an analysis sequence determination unit 315.

The control/processing unit 3 can be configured such that a personal computer including a CPU, a RAM, a ROM, and the like is used as hardware, and dedicated control/processing software (computer program) installed in the computer is executed on the computer to achieve at least a part of its functions.

The above-described computer program can be provided to a user by being stored in a non-transitory computer-readable recording medium such as a CD-ROM, a DVD-ROM, a memory card, or a USB memory (dongle). In addition, the program can be provided to the user in the form of data transfer via a communication line such as the Internet. Furthermore, the program can be pre-installed in a computer which is a part of a system (strictly, a storage device which is a part of the computer) when the user purchases the system.

An example of an LC/MS analysis operation executed by the LC unit 1 and the MS unit 2 in the LC-MS of the present embodiment will be briefly described. This is an example of a case where a product ion scan measurement is performed in the MS unit 2.

In the LC unit 1, the liquid feeding pump 11 draws the mobile phase from the mobile phase container 10 and feeds the mobile phase to the column 13 at a fixed flow rate. Under the control of the analysis control unit 32, the injector 12 supplies a sample into the mobile phase at a predetermined timing. The sample supply time point becomes a base point (holding time of zero) at the time of creating a chromatogram. The supplied sample is pushed by the mobile phase and introduced into the column 13. Then, various components in the sample are separated in the time direction by interaction with the liquid phase of the column 13 while passing through the column 13, and are eluted from the outlet of the column 13 in a temporally shifted manner.

In the case of product ion scan measurement, the analysis control unit 32 controls a voltage applied to the front quadrupole mass filter 25 so that ions having a predetermined m/z value derived from a component to be measured selectively pass through. In addition, a voltage applied to the rear quadrupole mass filter 28 is controlled so that the m/z value of passing ions changes subsequently over a predetermined m/z range.

The components in the eluate from the column 13 are electrostatically nebulized from the ESI probe 20 into the ionization chamber 201 to be ionized. The generated ions sequentially pass through the desolvation tube 21, the ion guide 22, the orifice of the skimmer 23, and the ion guide 24, and sent to the high vacuum chamber 204 and are introduced into the front quadrupole mass filter 25. Among various ions derived from the sample, only ions having a specific m/z value depending on the voltage applied to the front quadrupole mass filter 25 pass through the front quadrupole mass filter 25 and enter the collision cell 26 as precursor ions.

A collision gas such as Ar is intermittently introduced into the collision cell 26, and the precursor ions collide with the collision gas and are dissociated. The product ions generated by the dissociation exit the collision cell 26 while being converged by the ion guide 27, and are introduced into the rear quadrupole mass filter 28. As described above, the rear quadrupole mass filter 28 is driven so that the m/z value of passing ions changes with the lapse of time, and correspondingly, product ions passed through the rear quadrupole mass filter 28 and having a predetermined m/z value are incident on the ion detector 29. The ion detector 29 outputs an ionic intensity signal corresponding to the amount of incident ions to the control/processing unit 3 as a detection signal.

In the control/processing unit 3, the data processor 33 creates a mass spectrum (product ion spectrum) based on digitized data of the received detection signal, and creates a total ion chromatogram and an extracted ion chromatogram based on a repeatedly obtained mass spectrum.

In the LC-MS, as a mode of MS/MS analysis, MRM measurement, precursor ion scan measurement, and neutral loss scan measurement can be selectively performed in addition to the product ion scan measurement described above. In addition, as a mode of normal MS analysis, scan measurement and SIM measurement can be selectively performed. Normal MS analysis can be achieved by driving the rear quadrupole mass filter 28 similarly to a quadrupole mass filter in a single-type quadrupole mass spectrometer without performing ion selection in the front quadrupole mass filter 25 and ion dissociation operation in the collision cell 26.

Figure 2:
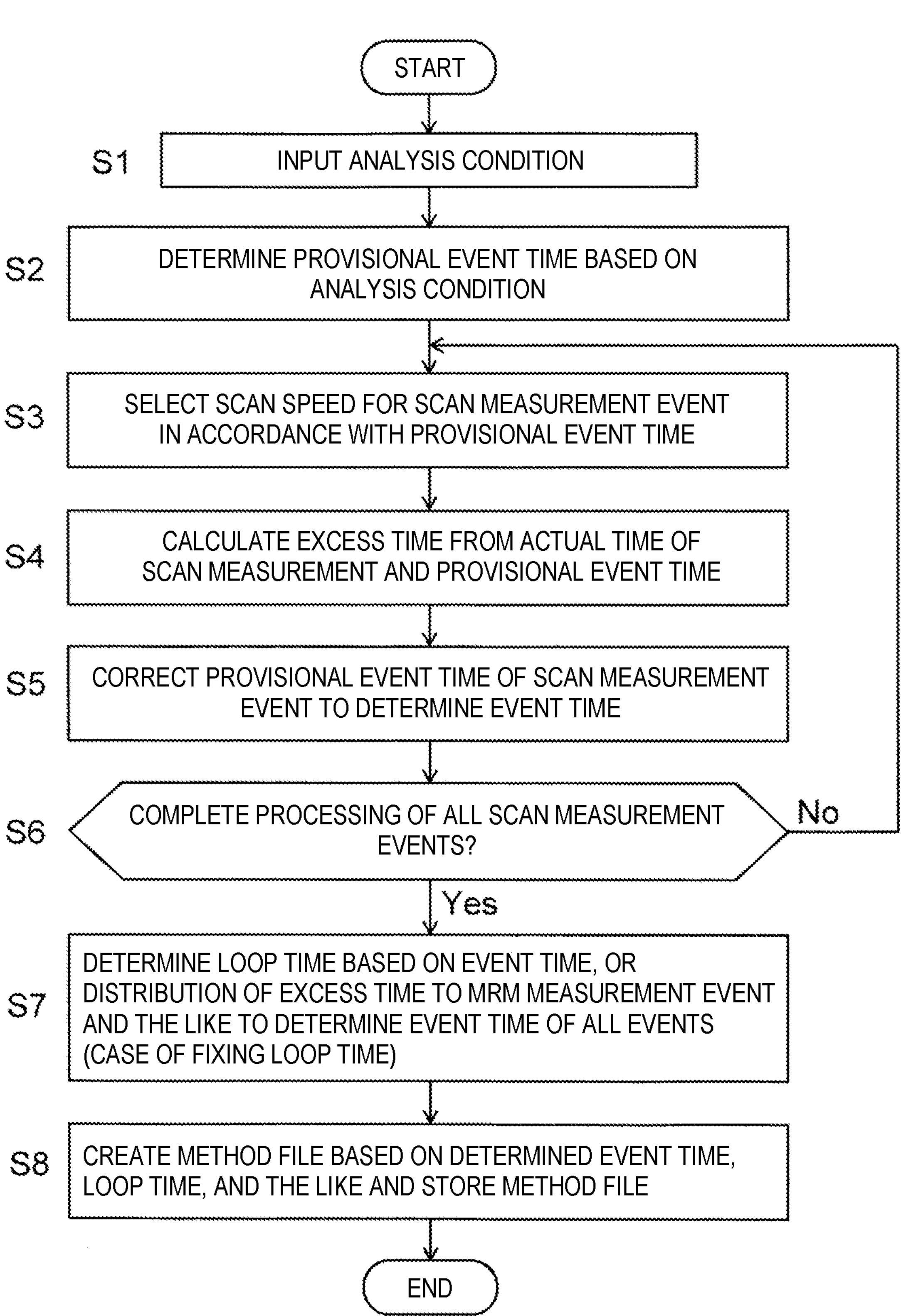
FIG. 2 is a flowchart showing an example of a creation procedure and processing of an analysis sequence in the LC-MS of the present embodiment.
Figure 3:
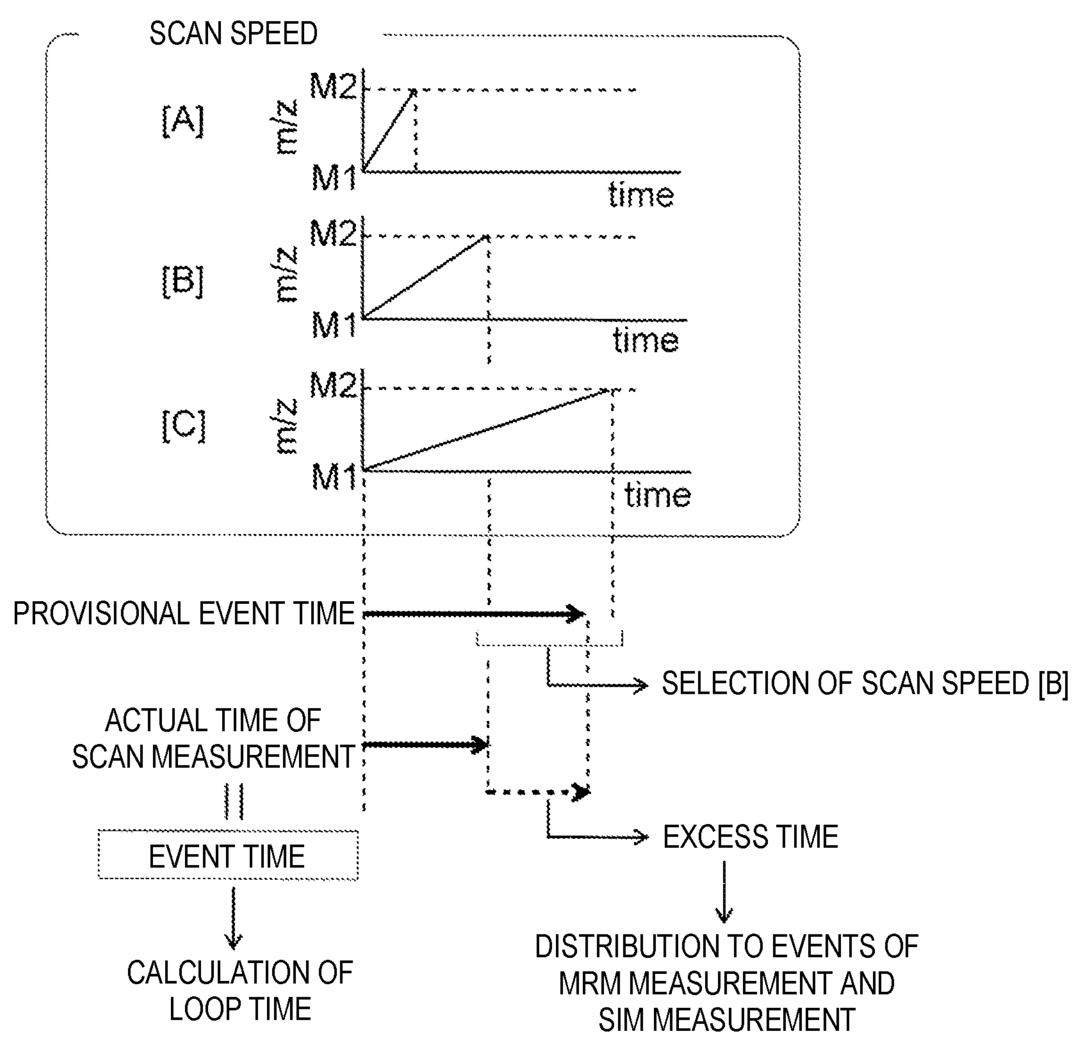
FIG. 3 is a schematic explanatory diagram of the creation procedure of the analysis sequence illustrated in FIG. 2.
Figure 4:
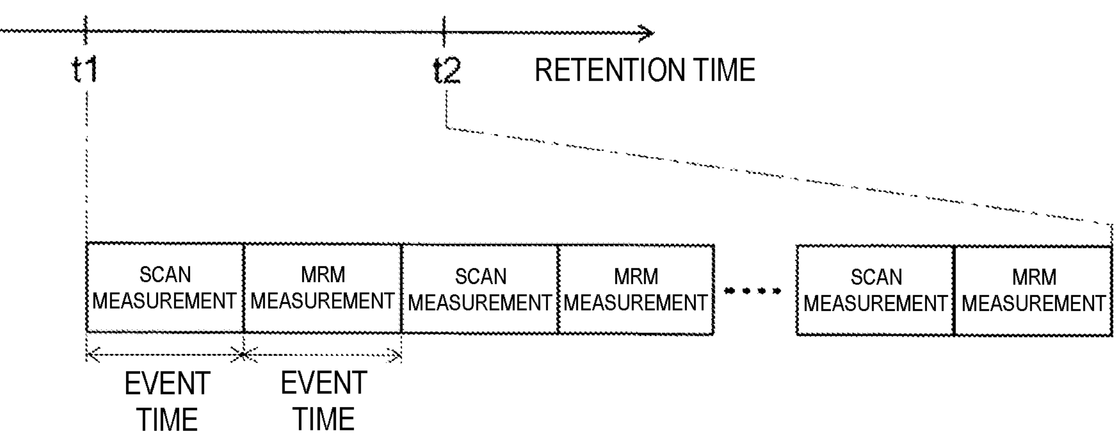
FIG. 4 is a schematic diagram illustrating an example of event setting.

In the LC-MS of the present embodiment, the analysis control unit 32 performs analysis by controlling each unit of the LC unit 1 and the MS unit 2 according to a method file describing an analysis sequence (method), which is a type of control information. Next, a procedure and processing of creating an analysis sequence in the LC-MS of the present embodiment will be described with reference to FIGS. 2 to 4. FIG. 2 is a flowchart showing an example of a creation procedure and processing of an analysis sequence in the LC-MS of the present embodiment. FIG. 3 is a schematic explanatory diagram of the creation procedure of the analysis sequence illustrated in FIG. 2. FIG. 4 is a schematic diagram illustrating a simple example of event setting.

Analysis conditions are set with a measurement unit called an event in the LC-MS of the present embodiment. In principle, one event may include one measurement mode. In addition, in the scan measurement mode, one event corresponds to one scan measurement. Therefore, for example, as described above, when the product ion scan measurement in a predetermined m/z range is repeated in a predetermined time range, the analysis conditions are set so that the event of the product ion scan measurement is repeatedly performed in the above time range.

An operator first inputs a parameter value for a prescribed analysis condition by the input unit 5, and the analysis condition setting unit 30 receives the input parameter value (step S1). Specifically, analysis conditions can include a time range of the retention time and the type of event (measurement mode) executed in the time range, an event time, an m/z range of a scan target in the case of scan measurement, an m/z value of a measurement target in the case of MRM measurement or SIM measurement, and the like. The event time is an execution time of one event. However, if the operator does not directly set the event time but sets a loop time corresponding to a sampling period or a reciprocal of the sampling period, the event time may be calculated inside the control/processing unit 3 by dividing the loop time by the number of events to be apparently simultaneously executed as described later. That is, the event time may be set directly or indirectly.

As a simple example, FIG. 4 illustrates a case where two types of events, a normal (MS analysis) scan measurement event for a predetermined m/z range and an MRM measurement event for a specific MRM transition, are executed within the retention time range from time t1 to time t2. This is intended to alternately and repeatedly perform scan measurements for a predetermined m/z range and MRM measurements for a specific MRM transition in the retention time range from t1 to t2, as shown in FIG. 4. However, one MRM measurement event is not limited to performing the MRM measurement for one MRM transition, and the MRM measurement may be performed for a plurality of different MRM transitions.

In the analysis sequence creation unit 31, the provisional event time determining unit 310 determines a provisional event time, by adopting the event time if a event time is set as one of the analysis conditions, or by dividing a loop time by the number of events if the loop time is set as the one of the analysis conditions (step S2).

Next, the scan speed selection unit 311 selects an optimum scan speed for the scan measurement event in accordance with the provisional event time (step S3). In the example illustrated in FIG. 3, three scan speeds [A], [B], and [C] can be adopted. [A] is the fastest scan speed, and [C] is the slowest scan speed, and in FIG. 3, each of the scan speeds is shown in a relationship between time and a change in the m/z value with scanning. Assuming that the m/z range of the scan in the scan measurement event is form M1 to M2, the scan speed [B] indicates that the time required for the scan measurement (the actual time of the scan measurement in FIG. 3) is equal to or less than the provisional event time, and the scan speed is the slowest. Therefore, in step S3, the scan speed [B] is selected.

The event time correction unit 312 calculates the difference between the actual time of the scan measurement obtained in the process of selecting the scan speed in step S3 described above and the provisional event time as an excess time (step S4). In the example of FIG. 3, the time required for the scan measurement under the scan speed [B] is the actual time of the scan measurement. The time required for the scan measurement determined depending on the scan speed is a discrete value with large increments. Therefore, in many cases, an unignorably long excess time occurs. In the conventional mass spectrometer, in actual measurement, the excess time is spent as an unnecessary time during which measurement is not substantially performed.

The event time correction unit 312 corrects the event time of the scan measurement event to the time obtained by subtracting the excess time from the provisional event time, that is, the actual time of the scan measurement, and then determines the event time (step S5). That is, if the excess time has occurred, the event time becomes shorter than the event time determined in accordance with the analysis condition. Thereafter, it is determined whether or not the processing of steps S3 to S5 has been completed for all scan measurement events, and if there is an unprocessed event, steps S3 to S5 are repeated. For example, if scan measurement events having different event times or different m/z ranges are set, different scan speeds may be selected for the scan measurement events, and thus steps S3 to S5 may be repeatedly executed.

When the event times of all the scan measurement events are determined by the processing up to step S6, the loop time calculation unit 313 determines a loop time based on the determined event time (step S7). In the example of FIG. 4, the scan measurement event and the MRM measurement event are alternately performed, and thus the event time of the scan measurement event and the event time of the MRM measurement event are added to provide the loop time. As described above, if the event time of the scan measurement event is shortened, the loop time is also shortened accordingly.

For example, a chromatogram created based on an ionic intensity signal for a specific MRM transition obtained by MRM measurement or an ion intensity signal of a specific m/z value obtained by scan measurement includes discrete data points for each loop time. Therefore, as the loop time is shorter, the accuracy of the peak waveform of the chromatogram is more improved. When the accuracy of the peak waveform is improved, the accuracy of the retention time obtained from the position of a chromatographic peak is improved, and thus the accuracy of component identification using the retention time is improved. In addition, when the accuracy of the peak waveform is improved, the accuracy of the area value of the chromatographic peak is improved, and thus the accuracy of quantification using the area value is improved. That is, both qualitative and quantitative accuracies are improved.

On the other hand, as described above, if a loop time is one of the analysis conditions and the loop time is fixed (cannot be changed), instead of shortening the loop time, the excess time can be distributed to events other than the scan measurement, specifically, the MRM measurement event and the SIM measurement event (step S7). In this case, the excess time distribution unit 314 distributes the excess time calculated in step S4 to the MRM measurement event and the SIM measurement event performed within the same loop time. For example, in the example of FIG. 4, the excess time is added to the event time of the MRM measurement event to lengthen the event time.

In the MRM measurement and the SIM measurement, a voltage allowing ions of an intended m/z value to pass is applied to each of the front quadrupole mass filter 25 and/or the rear quadrupole mass filter 28, and a time for which the voltage is statically determined elapses and then an ionic intensity signal is acquired for a predetermined dwell time. As the dwell time is longer, the detection sensitivity and the detection accuracy are more improved. As described above, when the event time of the MRM measurement event is lengthened, the dwell time can be lengthened accordingly, and thus the detection accuracy and the detection sensitivity can be improved. As a result, for example, it is possible to detect a minute amount of components that cannot be detected conventionally.

After the event time and the loop time of each event are determined in this way, the analysis sequence determination unit 315 determines the analysis sequence based on the analysis conditions including the event time and the loop time, creates a method file describing the sequence, and stores the method file in a storage unit (step S8).

The analysis control unit 32 controls each unit in accordance with the method file stored in the storage unit in this way, and thus enables efficient, highly accurate, and sensitive analysis in which an unnecessary time during which data is not acquired is reduced as compared with conventional cases.

In order to simplify the description, the case where the normal scan measurement and the MRM measurement are alternately performed has been described as an example.

However, it is clear that one or more of the product ion scan measurement, the precursor ion scan measurement, and the neutral loss scan measurement can be performed instead of or in addition to the normal scan measurement. It is also clear that changes can be made to perform the SIM measurement instead of or in addition to the MRM measurement.

In addition, the MS unit 2 of the LC-MS of the above embodiment is a triple quadrupole mass spectrometer, but it is clear that even in the case of using a single-type quadrupole mass spectrometer, the event time of the scan measurement event can be similarly shortened, and thus the loop time can be shortened and the excess time can be distributed to the SIM measurement event.

In addition, it is clear that the present invention can be applied not only to LC-MS but also to GC-MS, and can also be applied to a single mass spectrometer not combined with LC or GC.

The above embodiment is merely an example of the present invention, and it is a matter of course that deformations, modifications, additions, and the like appropriately made within the scope of the gist of the present invention are included in the claims of the present application.

[Various Aspects]

It will be understood by those skilled in the art that the exemplary embodiments described above are specific examples of the following aspects.

(Clause 1) One aspect of a mass spectrometer according to the present invention is a mass spectrometer capable of performing scan measurement, the mass spectrometer including:

a provisional event time determining unit configured to determine a provisional event time to be assigned to a scan measurement event, which is a measurement unit for performing one scan measurement, in accordance with an analysis condition specified by a user;

a scan speed selection unit configured to select a scan speed from a plurality of candidates such that a measurement time required for one scan measurement does not exceed the provisional event time of the scan measurement event;

an event time determining unit configured to correct the provisional event time of the scan measurement event to a time required for scan measurement under the scan speed selected by the scan speed selection unit, and set the provisional event time that has been corrected as an event time of the scan measurement event; and a control information creation unit configured to create control information for controlling the mass spectrometer based on the event time determined by the event time determining unit.

With the mass spectrometer according to Clause 1, the event time of the scan measurement event is shortened in accordance with the time required for the scan measurement under the adopted scan speed. As a result, an unnecessary time during which the measurement is not substantially performed conventionally is eliminated, and for example, the time interval of repetition of the scan measurement can be shortened by the eliminated time to improve the accuracy of a peak waveform in a chromatogram. Alternatively, it is possible to extend the time of an event which is performed apparently in parallel with the scan measurement, such as SIM measurement or MRM measurement, by the time obtained by shortening the event time of the scan measurement event. Extending the event time of, for example, the SIM measurement or the MRM measurement, the data capturing time in the event can be lengthened, and the detection sensitivity can be improved.

(Clause 2) In the mass spectrometer according to Clause 1, the control information creation unit may include an excess time distribution unit configured to distribute an excess time, which is a difference between the provisional event time of the scan measurement event and the time required for the scan measurement, to an event in which SIM measurement or MRM measurement is performed.

With the mass spectrometer according to Clause 2, as described above, the event time which is performed apparently in parallel with the scan measurement, such as SIM measurement or MRM measurement, can be extended by the shortened event time of the scan measurement event. As a result, the data capturing time in the SIM measurement or the MRM measurement can be lengthened, and the detection sensitivity and the detection accuracy can be improved.

(Clause 3) In the mass spectrometer according to Clause 1, the control information creation unit may include a loop time calculation unit configured to calculate a loop time corresponding to a sampling time interval based on the event time determined by the event time determining unit.

With the mass spectrometer according to Clause 3, as described above, the time interval of repetition of the scan measurement can be shortened, and the accuracy of the peak waveform in the chromatogram can be improved. As a result, the position (time) of a peak top of the peak becomes accurate, and the accuracy of component identification using the retention time is improved. In addition, the accuracy of the area value of the peak is improved, and thus the accuracy of quantification using the area value is improved.

(Clause 4) The mass spectrometer according to any one of Clauses 1 to 3 may be a single-type quadrupole mass spectrometer which performs scan measurement over a predetermined mass-to-charge ratio range as the scan measurement.

(Clause 5) In addition, the mass spectrometer according to any one of Clauses 1 to 3 may be a triple quadrupole mass spectrometer which performs at least one of precursor ion scan measurement, product ion scan measurement, and neutral loss scan measurement as the scan measurement.

REFERENCE SIGNS LIST

1 . . . Liquid Chromatograph Unit (LC Unit)
10 . . . Mobile Phase Container
11 . . . Liquid Feeding Pump
12 . . . Injector
13 . . . Column
2 . . . Mass Spectrometer Unit (MS Unit)
20 . . . ESI Probe
21 . . . Desolvation Tube
22, 24, 27 . . . Ion Guide
23 . . . Skimmer
25 . . . Front Quadrupole Mass Filter
26 . . . Collision Cell
28 . . . Rear Quadrupole Mass Filter
29 . . . Ion Detector
200 . . . Vacuum Chamber
201 . . . Ionization Chamber
202 . . . First Intermediate Vacuum Chamber
203 . . . Second Intermediate Vacuum Chamber
204 . . . High Vacuum Chamber
3 . . . Control/Processing Unit
30 . . . Analysis Condition Setting Unit
31 . . . Analysis Sequence Creation Unit
310 . . . Provisional Event Time Determining Unit
311 . . . Scan Speed Selection Unit
312 . . . Event Time Correction Unit
313 . . . Loop Time Calculation Unit
314 . . . Excess Time Distribution Unit
315 . . . Analysis Sequence Determination Unit
32 . . . Analysis Control Unit
33 . . . Data Processor
5 . . . Input Unit
6 . . . Display Unit

The invention claimed is:

1. A mass spectrometer capable of performing scan measurement, the mass spectrometer comprising:

a provisional event time determining unit configured to determine a provisional event time to be assigned to a scan measurement event, which is a measurement unit for performing one scan measurement, in accordance with an analysis condition specified by a user;

a scan speed selection unit configured to select a scan speed from a plurality of candidates such that a measurement time required for one scan measurement does not exceed the provisional event time of the scan measurement event;

an event time determining unit configured to correct the provisional event time of the scan measurement event to a time required for scan measurement under the scan speed selected by the scan speed selection unit, and set the provisional event time that has been corrected as an event time of the scan measurement event; and a control information creation unit configured to create control information for controlling the mass spectrometer based on the event time determined by the event time determining unit.

2. The mass spectrometer according to claim 1, wherein the control information creation unit includes an excess time distribution unit configured to distribute excess time, which is a difference between the provisional event time of the scan measurement event and the time required for the scan measurement, to an event in which SIM measurement or MRM measurement is performed.

3. The mass spectrometer according to claim 1, wherein the control information creation unit includes a loop time calculation unit configured to calculate a loop time corresponding to a sampling time interval based on the event time determined by the event time determining unit.

4. The mass spectrometer according to claim 1, wherein the mass spectrometer is a single-type quadrupole mass spectrometer which performs scan measurement over a predetermined mass-to-charge ratio range as the scan measurement.

5. The mass spectrometer according to claim 1, wherein the mass spectrometer is a triple quadrupole mass spectrometer which performs at least one of precursor ion scan measurement, product ion scan measurement, and neutral loss scan measurement as the scan measurement.

* * * * *